Sept. 2, 1958  D. P. LOVELESS  2,849,906
SEAL REMOVAL TOOL
Filed Jan. 27, 1956
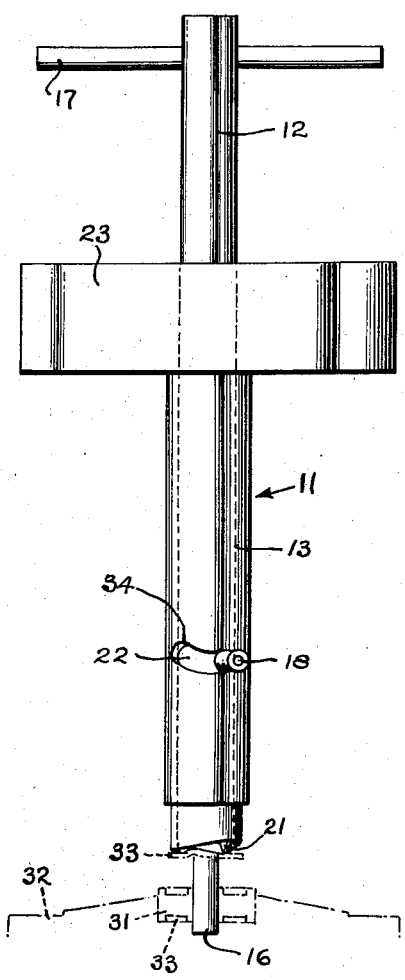
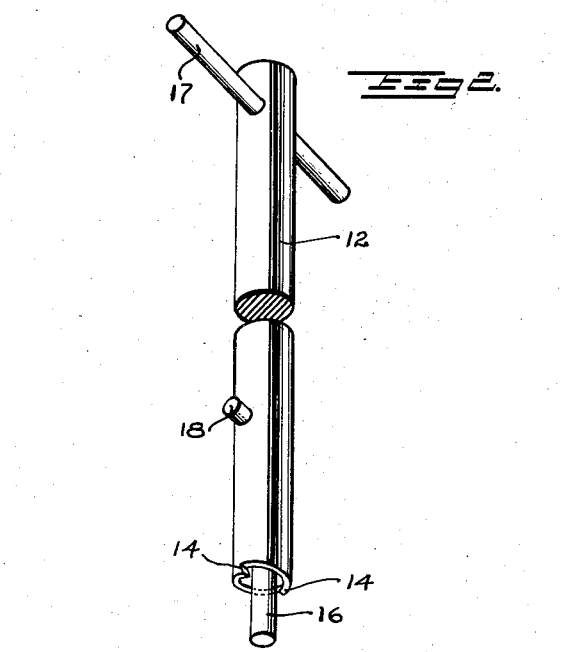
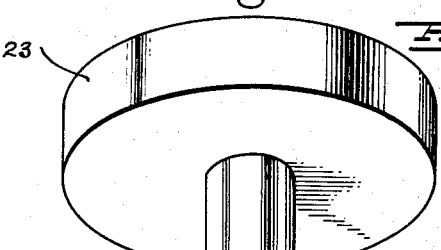
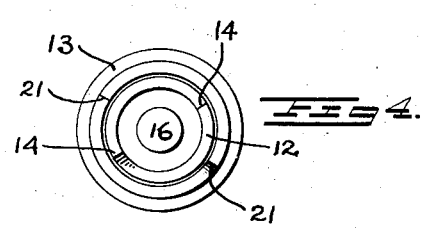
INVENTOR:
DEAN P. LOVELESS
BY Edward H. Goodrich
HIS ATTORNEY.

United States Patent Office 2,849,906
Patented Sept. 2, 1958

2,849,906

SEAL REMOVAL TOOL

Dean P. Loveless, St. Clair Shores, Mich., assignor to General Motors Corporation, Detroit, Mich., a corporation of Delaware Application January 27, 1956, Serial No. 561,782

7 Claims. (Cl. 81—3)

The present invention relates to a tool for removing seal or shield elements from bearings. The tool is particularly designed for use with bearings which utilize protective seals fitted between the outer and inner bearing rings to enclose the balls or other anti-friction elements. The seals are normally thin disc-like members made up of fibrous, rubbery or metallic material fashioned so as to fit tightly between the race rings.

When a sealed bearing of this general type is found to be defective it is usually possible to salvage the bearing by replacing or repairing the defective component. Salvaging such a bearing requires disassembly, the first step of which comprises removal of the seal. Simple as this step appears to be, it has long been a problem to conveniently and expeditiously remove such seals without further damaging the bearing components or injuring a workman's fingers.

Many devices and means have been employed in pursuance of a solution to this seal removal problem and have included digging the seal out with a sharp implement like a pick or screwdriver, spinning, piercing through the opposite seal and pushing out a seal, welding on a rod to provide a handle for pulling out the seal, blowing out the seals, etc.

None of these methods or means has, however, proved to be commercially satisfactory. While the bearing industry is itself highly developed technically, no successful tool is known to have been developed to meet this particular problem of seal removal.

Accordingly, it is an object of the present invention to provide a simple tool which will facilitate the removal of such seals from bearings.

The subject tool generally includes two sets of teeth which individually pierce or otherwise engage the seal, and which teeth are thereafter oppositely rotated so as to pinchingly engage and ultimately deform the seal making its removal a simple matter.

A detailed description of the tool following.

In the drawings:

Fig. 1 is an elevational view of the tool.

Figs. 2 and 3 are perspective views, respectively, of the inner and outer members of the tool, the two views together constituting an exploded view of the complete assembly.

Fig. 4 is a bottom view of the tool as shown in Fig. 1.

Referring to the drawings, the tool is shown in general at 11 and includes an inner tubular or cylindrical member 12 and an outer tubular or sleeve member 13. The inner tubular member 12 includes a plurality of teeth 14 depending in circumferentially spaced relation about the periphery of one end thereof. While member 12 has been shown with two teeth, one or more teeth will function properly. The teeth as shown represent a preferred, though not critical, form and are generally of helical form and have work engaging or cutting surfaces inclined in the direction of ultimate seal engagement. The inclination or hooking of the teeth provides better contact and more positive engagement with the seal. The helical form of the teeth while again not imperative does provide greater shear strength in the teeth as well as ease of manufacture.

Extending from the toothed end of the tubular member 12 is a guide pin 16 or pilot member which projects longitudinally beyond the teeth 14 and is adapted to center the tool relative to a bearing seal. A handle 17 is provided at the end of the tubular member 12 remote from the teeth and guide pin, and provides means whereby the inner member and more particularly teeth 14 can be rotated. A second pin 18 is disposed intermediate the ends of the tubular member 12 and projects radially therefrom in normal relation to the first pin 16. Pin 18 can be removably mounted in member 12, as by threading, in order to permit assembly of the members 12 and 13.

The outer sleeve member 13 includes teeth 21 likewise formed at one end thereof and which, when the members 12 and 13 are assembled, are concentrically disposed adjacent the corresponding teeth 14 of member 12. A handle or gripping member 23 is provided on the sleeve 13 remote from the toothed end thereof and provides means whereby the sleeve and teeth 21 may be held or rotated. The shape of teeth 21 is identical to that of teeth 14, however, while the teeth on each tubular member are inclined in the same direction relative to each other they are oppositely inclined with respect to the corresponding teeth on the other tubular member. Thus, in their relative disposition to each other, the work engaging surfaces or teeth 14 and 21 can be likened to those of shears, pinchers or pliers. As best illustrated in Figs. 2 and 3, the teeth 14 of the inner member 12, looking from the bottom, face in a clockwise direction while teeth 21 of outer member 13 face in a counter-clockwise direction. It is unimportant in which direction the sets of teeth face as long as one set is oppositely disposed with respect to the other.

A curved slot 22 is formed in sleeve 13 and is adapted to receive pin 18 of the inner tubular member. The curvature of slot 22 serves as a cam track and is such that upon relative rotation between the inner and outer members 12 and 13, the pin 18 is cammed by the sides of this slot causing relative longitudinal movement between the members. The normal longitudinal movement of the inner member is such as to move the teeth 14 from an upper or retracted position relative to teeth 21 axially downwardly toward the teeth 21 to pierce or engage with a seal member in the course of the downward movement.

As shown in phantom relief in Fig. 1, a defective sealed bearing 31 is mounted in a supporting fixture 32. The bearing includes seals 33. The bearing 31 and fixture 32 have been shown merely to illustrate the functioning of the tool and otherwise form no part of the present invention. While a fixture has been shown supporting the bearing about its outer raceway in order that the guide pin 16 may fit within the inner race ring shaft opening, it is within the purview of this invention to utilize a guide member mounted on the outer sleeve 13. Such a guide member would center the tool by coacting with the outer race ring while utilizing a fixture which supported the bearing through the inner race ring shaft opening.

The operation of the tool is as follows:

The guide pin 16 is inserted within the shaft opening of the inner race ring of the sealed bearing 31. The members 12 and 13 are relatively rotated to position the follower pin 18 in the upper portion 34 of the slot 22 moving the teeth 14 to their retracted position. The outer sleeve 13 is then moved downwardly and rotated in a clockwise direction, viewed from the top of the tool, causing the teeth 21 to pierce or dig into the seal 33. The sleeve 13 and seal 33 are thereafter held against rotation while the inner member 12 is rotated in a clockwise direction. The rotation of the inner member is such as to cause the pin 18 in proceeding from the high point 34 in the slot 22 to follow the slot curvature moving the inner tubular member longitudinally downwardly toward the seal 33 causing teeth 14 to pierce and pinchingly engage the seal between the teeth of the inner and outer members. Further relative contra-rotation between the members 12 and 13, caused by moving one or both members, will accentuate the pinchers effect on the seal causing it to crumple somewhat, as shown in Fig. 1, and making it a simple matter to withdraw the tool with the seal impaled on the teeth thereof.

The tool as shown and described is hand operated; however, the construction and operation of the tool readily lends itself to automatic or production line operation.

Many other structural modifications of the subject tool are possible within the intended scope of the present teaching which is intended merely to be illustrative of the simplest form of the invention.

I claim:

1. A bearing seal removal tool comprising a pair of coaxial tubular members in relatively rotatable and slidable interfitting relation, longitudinal extending tooth means formed on each of said members at one end thereof, a centering guide element axially projecting from one of said members, means for rotating one member relative to the other, one of said members having a cam track, and a follower element on the other member, said follower element engaging and being guided by the cam track upon the relative rotation of said members to provide relative longitudinal movement between said members.

2. A tool comprising a cylindrical element having tooth means at one end thereof, a guide member secured to said element, the guide member being coaxial with and extending longitudinally beyond the tooth means, a handle on said element and remote from the tooth means, a follower member projecting from said element intermediate the handle and tooth means, a cylindrical sleeve element rotatably and slidably mounted on the cylindrical element, said sleeve having tooth means formed at one end proximate the cylindrical element tooth means, a handle remote from the tooth means, and said sleeve element having a cam portion engaging said follower member to cause relative longitudinal movement between the elements upon the relative rotation thereof.

3. A bearing seal removal tool comprising a pair of elongated members in relatively rotatable and axially slidable relation, said members having adjacent ends respectively provided with sets of projecting teeth, a pilot member for locating both sets of teeth with respect to a bearing seal, one of said members having an arcuate cam track, a pin projecting from the other member and in engagement with said track and providing for relative axial movement between the sets of teeth in response to relative rotation between said elongated members.

4. A tool comprising an elongated member, a sleeve member rotatably and slidably journalled thereon, each of said members having an adjacent end, an annular set of teeth projecting from each of said adjacent ends, a pilot member projecting from one of said members for centering the tool relative to a work piece, and an interfitting connection between the elongated member and the sleeve member including a cam track on one member and a pin on the other member engaging said cam track, said pin and cam track providing for axially slidable movement of one of said members with respect to the other member upon a relative rotation of said members.

5. A tool as defined in claim 4 in which the teeth of each annular set are angularly inclined to provide work gripping portions and the teeth of one set are inclined in opposing work engaging relation to the teeth of the other set.

6. A tool comprising a pair of coaxial interfitting tubular members for relative rotation and slidable movement, a pilot element axially projecting from the end of one of said members for centering the tool relative to a work piece, said tubular members having adjacent end portions respectively provided with annular sets of longitudinally projecting teeth, said sets of teeth having inclined cutting portions, the inclinations of the teeth of each set being in a corresponding angular relation to the axis of the tubular members and the inclination of the two sets of teeth being in opposing relation to each other, one of said tubular members having an arcuate cam slot, and a pin laterally projecting from the other tubular member into engagement with a side of said slot whereby relative rotation of the tubular members effects a simultaneous axial and rotary movement of one set of teeth with respect to the other set of teeth.

7. A bearing seal removal tool comprising a pair of elongated inner and outer tubular members in coaxially slidable relatively rotatable relation, adjacent end portions on said members respectively provided with annular sets of longitudinally projecting teeth, the teeth of each set being correspondingly inclined and the inclinations of the two sets of teeth being in opposing relation to each other, the outer tubular member having an arcuate cam slot, a pin secured to and laterally projecting from the inner tubular member and slidably engageable with opposing sides of said slot to produce a controlled relative rotation and axial movement of the sets of teeth when relative rotation is imparted to the tubular members, and a pilot member secured within and axially projecting from the inner tubular member in radially spaced relation to both sets of teeth, said pilot member serving to center the tool with respect to a seal during its removal.

References Cited in the file of this patent

UNITED STATES PATENTS

| | | |
|---|---|---|
| 1,393,605 | Bergskaug | Oct. 11, 1921 |
| 1,719,420 | Blain | July 2, 1929 |
| 2,075,520 | Hardesty | Mar. 30, 1937 |